United States Patent [19]

Srivastava et al.

[11] Patent Number: 4,607,283

[45] Date of Patent: Aug. 19, 1986

[54] VERTICAL PICTURE CENTERING CIRCUIT

[75] Inventors: Gopal K. Srivastava, Buffalo Grove, Ill.; Julian E. Warrick, Utica, N.Y.

[73] Assignee: Zenith Electronics Corporation, Glenview, Ill.

[21] Appl. No.: 593,341

[22] Filed: Mar. 26, 1984

[51] Int. Cl.$^4$ .............................................. H04N 5/04
[52] U.S. Cl. .................................... 358/148; 358/158
[58] Field of Search ............... 358/148, 149, 150, 151, 358/158, 154, 140, 152

[56] References Cited

U.S. PATENT DOCUMENTS 4,025,951  5/1977  Eckenbrecht ...................... 358/158
4,298,890  11/1981 Lai et al. ............................. 358/158

Primary Examiner—James J. Groody
Assistant Examiner—Michael D. Parker

[57] ABSTRACT

The present invention discloses a device and method for compensating for the time lag associated with circuitry within the television receiver when recognizing vertical sync. Accordingly, one aspect of the present invention introduces a static phase correction into the vertical drive sequence for a standard signal so that the television picture is more nearly vertically centered on the screen. Additional aspects of the invention provide for compatibility with other circuits in the television receiver. Specifically, a delay generator coordinates with the phase corrector and other phase and frequency monitoring circuits so that the receiver is not needlessly triggered into nonstandard operation.

7 Claims, 5 Drawing Figures

VERTICAL PICTURE CENTERING CIRCUIT

BACKGROUND OF THE INVENTION

The present invention relates generally to the television art and more particularly to the vertical centering of the video picture on the television screen. Even more particularly, the present invention relates to the phase correction of the vertical drive signal, which controls the vertical flyback in a raster display, to overcome the "real-time" response lag in a television receiver.

In a typical television system, a broadcasting station transmits a television signal which is picked up by a receiver either off the airwaves by means of an antenna or directly from a transmission cable. The receiver then translates this signal for display on the television screen. Typically, video is displayed on the screen via a display beam in a time-coordinate, raster-like fashion. The horizontal and vertical sweeping action of the display beam is normally controlled by circuits within the receiver which are responsive to vertical and horizontal synchronizing information also contained in the transmitted signal.

The horizontal and vertical sync information in the transmitted signal typically takes the form of pulses of defined duration. Also, the horizontal sync pulses and the vertical sync pulses occur during horizontal and vertical blanking intervals, respectively, during which no video information is present in the transmitted signal. Circuits within the television receiver respond to these pulses to cause the sweeping display beam to flyback to the left edge of the screen at the end of each horizontal line and to flyback to the upper left corner of the screen at the end of each vertical field. Thus, in an ideal receiver, the horizontal and vertical flybacks occur during the respective horizontal and vertical blanking intervals when no video information is present to appear on the screen. It may be desireable however to cause the vertical flyback to occur at some fixed, predetermined time other than the vertical blanking interval in order to implement a particular effect or feature. In other words, the phasing of the vertical flyback relative to the blanking period should be made controllable which, in effect, allows for the predetermined control of the vertical picture centering function.

More importantly, however, the circuits within the television receiver normally do not instanteously recognize the vertical sync information. Typically, vertical sync information will have been present for 50 microseconds or longer before the sync circuit reacts to trigger a vertical drival signal to return the video display beam to the upper left hand corner of the screen and begin a new vertical display field. Consequently, the new display field does not begin coincidently with the initiation of the vertical sync pules which define the vertical display field; there is a "real time" lag approximately corresponding to the recognition time of the particular vertical sync detecting circuit employed.

Significantly though, many teletext systems transmit information immediately following the vertical blanking interval. At times this information may be vital teletext page organizing instructions and at other times it may be data to be displayed as part of a complete teletext page or a header at the top of the screen. In such instances it is undesirable that this information be lost when displaying the page. However, because of the "real time" lag in the vertical sync detection and vertical drive circuits, the information contained near the vertical blanking interval will usually be lost from the display entirely, because the picture is vertically offset.

Therefore, it is a principal object of the present invention to provide a means and method for initiating each vertical display field more nearly coincidently with the initiation of the vertical sync information in the transmitted signal.

It is a related object of the present invention to provide a means and method for the control of the vertical centering of a television picture.

It is a further related object of the present invention to provide a means and method for statically correcting the phasing of a television picture display.

It is still a further object of the present invention to modify and utilize existing circuits in a television system providing for a means of exacting the control over the phasing of the display while maintaining compatibility with such existing circuitry.

It is yet a further object of the present invention that it accomplish its objectives at a low cost with a small number of components.

Accordingly, the present invention provides for a correction factor to be introduced into the generation of the vertical drive signal to eliminate, at least partially, the "real time" lag introduced by the vertical sync detection circuits. Relying upon known characteristics of the sync detection circuits and a standard transmitted signal, the preferred embodiment of the present invention changes the preset starting count for the receiver's vertical countdown circuit (described in more detail in U.S. Pat. No. 4,298,890 entitled "Digital Vertical Synchronization System For A Television Receiver"). Utilizing a vertical countdown as presently incorporated in many television receivers avoids undesirable jittering of the picture, which may be introduced otherwise. To compensate for the delay in recognition of the vertical sync pulses, typically about one to one and one-half lines, the preset count of the counter is advanced from "20" to "22" which ultimately causes the vertical drive signal to be generated one horizontal line sooner than normal. To avoid circuit runaway, the "22" preset is enabled only once for each standard signal detected. Thereafter, the countdown circuit generates a vertical drive pulse every 525 counts as it normally would. Thus, this aspect of the present invention shifts the time phase of the vertical drive signals back in time one horizontal line period. Another aspect of the preferred embodiment senses when the system changes from a nonstandard mode, typical of use with a home computer or video recorder, to a standard mode, typical of a normal transmitted signal, to trigger the one-time adjustment of the countdown circuit preset. Yet another aspect of the preferred embodiment provides for the generation of a delayed pulse to be compared in a coincidence detector with the integrated vertical signal derived from the vertical sync pulses. This coincidence detection is used for other purposes such as frequency and phase detection as described in U.S. Pat. No. 4,298,890.

BRIEF DESCRIPTION OF THE DRAWINGS

The features of the present invention which are believed to be novel and inventive are set forth with particularity in the appended claims. The invention, together with further objects and advantages thereof, may be best understood by reference to the following detailed description taken in conjunction with the accompanying drawings wherein:

DESCRIPTION OF A PREFERRED EMBODIMENT

Figure 3:
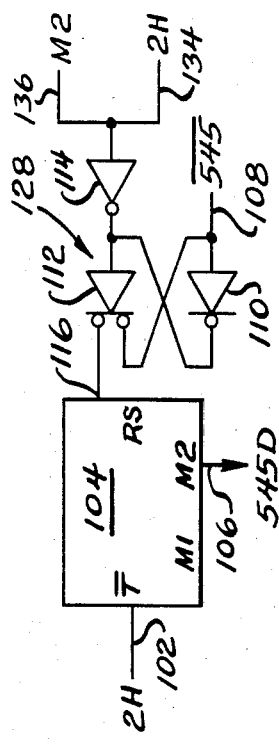
FIG. 3 is a 545D (delayed) pulse generator schematic diagram employing integrated injection logic.

The present invention seeks to provide an approximate vertical picture centering function by introducing a static phase correction into the vertical drive circuitry. The preferred embodiment of the present invention described herein is compatible with prior art standard/nonstandard mode recognition circuits. Likewise, the preferred embodiment of the present invention is compatible with the prior art vertical countdown circuit as described more fully in U.S. Pat. No. 4,298,890, Lai and Srivastava, "Digital Vertical Synchronization System For A Television Receiver", issued Nov. 3, 1981, and assigned to Zenith Radio Corporation, the assignee of the present invention.

Briefly, in standard mode operation the vertical countdown circuitry counts 525 pulses which are occurring at a twice horizontal rate (commonly referred to as 2H rate) as is well known in the art. In this system, the counter is normally preset to a "20" count and therefore typically counts to state "545" and emits a pulse (commonly referred to as a 545 pulse) which is used in the vertical drive circuitry to initiate the vertical drive for vertical flyback of the raster display. When the television receiver is responding to a standard television signal, a series of 545 pulses are emitted as shown generally by the pulse train of waveform A in FIG. 2.

In the prior art system, the 545 pulse is used not only to initiate the vertical drive function, but also to compare with the integrated vertical pulse (I.V.) in a coincidence detector as described in U.S. Pat. No. 4,298,890 to monitor the phasing and frequency of the system.

In an N.T.S.C. standard signal, there is a three horizontal line period referred to as the vertical sync interval. The vertical blanking interval is a 19 line period beginning 3 lines prior to the vertical sync period and terminating 13 lines following the vertical sync period.

Prior circuitry such as that described in U.S. application Ser. No. 540,740 filed Oct. 11, 1983 by Warrick and assigned to Zenith Radio Corporation, the assignee of the present invention, detects this vertical sync period and generates an I.V. pulse in response. The I.V. pulse generated by this circuit has a carefully defined width and duration and may be used in the vertical drive circuitry and for comparison with the 545 pulse for frequency and phase detection. However, due to the criteria used in that circuitry for deciding whether vertical sync has been detected, that circuit generates the I.V. pulse approximately one and one-fourth to two horizontal lines after the vertical sync actually begins. Thus, the vertical drive signal and the corresponding 545 pulse will lag the initiation of vertical sync pulses by that same one and one-fourth to two line period.

In standard mode operation, 525 counts of 2H rate pulses separate the initiation of each I.V. pulse. Thus, when a "20" preset is used in the countdown circuitry, the 545 pulse will correspond to the I.V. signal, if that signal is a standard signal as detected by the coincidence circuitry. However as mentioned above, this means that the 545 pulse lags the start of the first vertical serration by approximately 1¼ to 2 lines. Thus, vertical drive lags by the same amount, and the vertical flyback will not occur as accurately in phase during the vertical sync interval as it would if the system responded more quickly to the presence of the vertical sync pulses.

One way to correct this difficulty is to trigger the I.V. pulse more quickly after the initiation of the vertical sync pulses. But as explained more thoroughly in U.S. application Ser. No. 540,740, the teachings of which are incorporated herein for reference, the circuit will lose the noise immunity which is necessary to provide suitable performance.

Normally, the fact that the vertical drive pulse and the corresponding 545 pulse lag the initiation of the vertical sync pulses will not cause any inconvenience in the television picture. The standard TV signal does not contain any active video information to be displayed for many lines following the vertical sync period. Thus, normally, the video display will not be disrupted. However, in a videotext or teletext system information is frequently transmitted on more lines of the vertical display, often very near the end of the blanking interval itself. When this occurs, the information which is transmitted near the end of the vertical blanking interval will not be displayed on the screen because of the phase offset between the initiation of the vertical sync pulses and the generation of the vertical drive signal. That is, the information very near the blanking interval will be lost because of the real time delay in the initiation of the blanking interval when the vertical blanking period is defined by a generated pulse which is initiated at the beginning of the vertical drive pulse and has a nineteen line duration. Because of this, it is desirable to cause the vertical drive signal to occur more nearly coincidentally with the initiation of the vertical sync period in order to make all information viewable.

Because the vertical drive is tied to the 545 pulse, when receiving standard signals, it is possible to shift the vertical drive signal by advancing the 545 pulse. In the preferred embodiment of the present invention, that is accomplished by a one-time change in the normal preset of the vertical countdown circuit from "20" to "22" which creates an interval between successive 545 pulses of only 523 counts, each count being at a 2H rate. This effectively advances the 545 pulse train one horizontal line period and introduces a static one-line phase correction into the circuit.

However, it is desirable to perform this phase correction only when a standard signal is present. The standard N.T.S.C. signal is the only signal for which it is guaranteed that 525 counts of of a 2H rate clock correspond to each vertical display field. Further, it is desirable to perform this phase correction only once during the standard signal, preferably at the very beginning, so that the 525 count relationship is preserved. Accordingly, the preferred embodiment of the present invention enables the "22" preset only upon transition from a nonstandard mode to a standard mode, and this preset is changed only for the first vertical field following the transition. For the remainder of the fields in the standard signal, the preset "20" is re-enabled.

Also, as mentioned above, the 545 pulse is used to detect coincidence with I.V. pulses for phase and frequency detection. But, because of the one line shift which will have been introduced into the 545 pulse train, there will no longer be coincidence between the 545 pulses and the I.V. pulses even if a standard signal is still present. However, the circuit criteria of the underlying system are such that if the lack of coincidence between the 545 pulse and the I.V. pulse prevailed for a long enough time, the circuit would normally trigger into nonstandard mode operation. Therefore, once per vertical field, the preferred embodiment of the present invention generates a 545D pulse which is delayed one horizontal line period from the 545 pulse. Correspondingly, the preferred embodiment enables the coincidence circuits to compare the 545D pulse with the I.V. pulse while the standard signal endures. Thus, the vertical countdown system is not triggered needlessly into the nonstandard mode.

Figure 1:
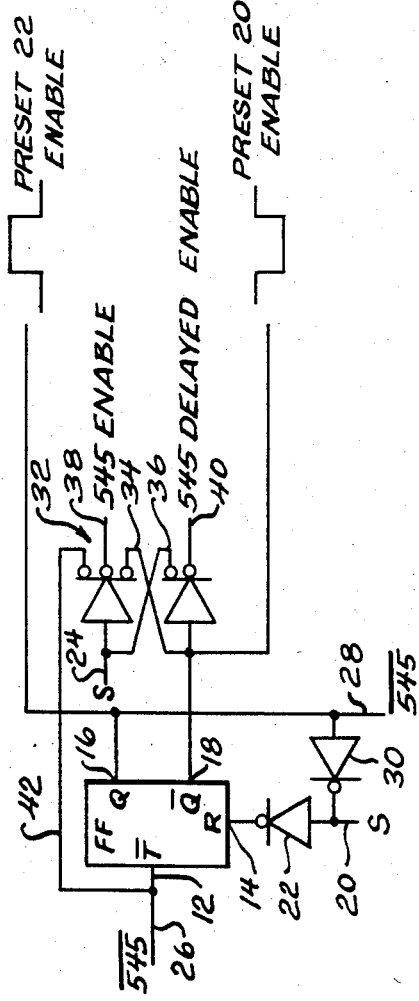
FIG. 1 is an integrated injection logic schematic of a static phase correcter according to the preferred embodiment of the present invention.

Referring now to FIG. 1, therein is shown a detailed circuit schematic diagram illustrating one aspect of the preferred embodiment of the present invention using integrated injection logic ($I^2L$). Specifically, a flip-flop 10 having toggle input 12 and reset input 14 with corresponding Q output 16 and $\bar{Q}$ output 18 is shown.

The reset input 14 in the configuration of FIG. 1 is used so that only a standard signal is phase corrected. When a nonstandard signal is received, a signal on a line 20 is low which controls an inverting gate 22 to insure that a high signal is present at reset input 14. When reset input 14 is continuously high, the Q output 16 of flip-flop 10 is continuously at a low state. The Q output 16 is referred to as a PRESET 22 ENABLE signal, which will only occur at some point when reset 14 is not high. This can only occur when the signal on line 20 is high as indicative of the presence of a standard signal. Thus, the main vertical countdown circuit counter will only be preset to "state 22" when a standard signal indication is present on line 20.

Figure 2:
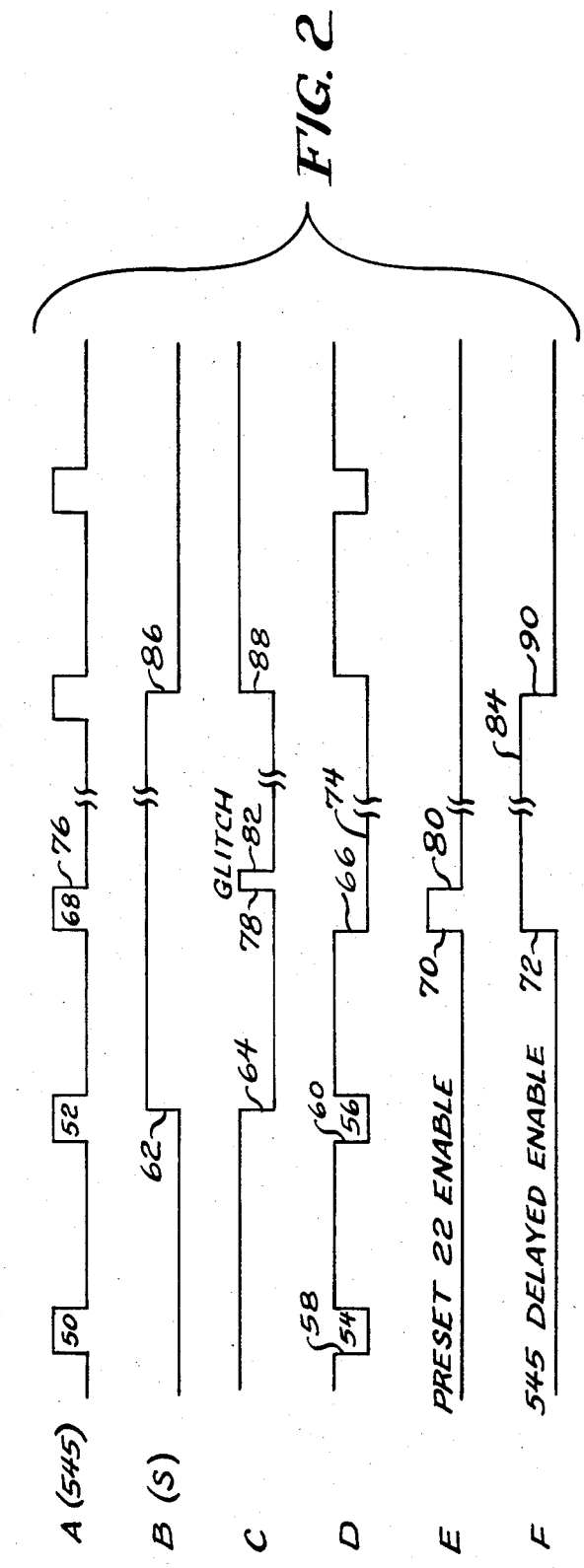
FIG. 2 is a collection of waveforms showing signals at various points in the schematic of FIG. 1.

In addition to the standard signal indication S which is received on both line 20 and on a line 24, the circuit of FIG. 1 receives a $\overline{545}$ signal, which is the logical inversion of the 545 signal illustrated in waveform A in FIG. 2, as an input on lines 26 and 28. In the preferred embodiment, these inputs are used in conjunction with the standard signal indication and associated feedback paths described below to toggle flip-flop 10, thus initiating a PRESET 22 signal at its Q output 16 and ultimately disabling the same PRESET 22 signal and re-enabling the PRESET 20 signal at the $\bar{Q}$ output 18 of flip-flop 10 once the main counter has been preset to state 22.

A second flip-flop 32 comprising gates 34 and 36 is also illustrated in FIG. 1. It will be appreciated from this configuration that when a non-standard signal is present, i.e. the signal on line 24 is low, the output of gate 34 on a line 38 will be high. The signal, as labelled, enables the coincidence detection circuits (not shown) to compare the 545 pulse with the I.V. pulse. Similarly, when the $\bar{Q}$ output 18 of flip-flop 10 is driven low (by the toggling of flip-flop 10 to force Q output 16 high), the output of gate 36 on a line 40 will go high. The signal on line 40, as labelled, enables the coincidence detection circuitry to compare the 545D (delayed) pulse with the I.V. pulse. Correspondingly, the high output of gate 36 coupled with a high signal on line 24, indicative of the presence of a standard signal, will drive the output of gate 34 low. This latches the input to gate 36 low, which latches its output high. Thus, flip-flop 32 will be latched into a "545 ENABLE low, 545D ENABLE high" state until the signal on line 24 goes low indicating the termination of the standard signal. Also, when the 545 ENABLE signal at the output of gate 34 goes low, toggle input 12 to flip-flop 10 is latched low by the tying action of line 42 until the 545 ENABLE signal goes high again. As mentioned, this will occur only when the standard signal terminates as detected on line 24. Thus, after the main counter is preset once to "22" and the coincidence detector is enabled to compare the 545D pulse with the I.V. pulse, the circuit of the preferred embodiment will not allow a PRESET 22 signal again and will ensure a comparsion between I.V. and 545D as long as a standard signal is present.

The 545 ENABLE signal and the 545D ENABLE signal are supplied to the coincidence detection circuitry wherein they enable 545 pulses and 545D pulses, respectively. That is, if the 545D pulses are enabled, only those pulses will be compared for coincidence and the 545 pulses will be blocked. Alternatively, if the 545 pulses are enabled, only they will be compared for coincidence and the 545D pulses will be blocked. Any number of common logic circuit configurations may be used to effectuate this function as would be apparent to one skilled in the art and familiar with the teachings of this application.

The operation of the circuit of FIG. 1 may be more fully understood with reference to the timing diagram of FIG. 2. FIG. 2 is a collection of waveforms of which:

Waveform A (545) is a representation of the 545 pulse train, the logical inversion of which is received by the circuit of FIG. 1 as inputs on lines 26 and 28;

Waveform B (S) is a representation of a possible signal having a first nonstandard portion followed by a standard portion followed by another nonstandard portion. This signal is received by the circuit of FIG. 1 as inputs on lines 20 and 24;

Waveform C is a representation of the reset signal at reset input 14 in response to the signals shown in waveforms A and B;

Waveform D is a representation of the input signal at toggle input 12 in response to the signals of waveforms A and B;

Waveform E is a representation of the PRESET 22 ENABLE signal which is present at the Q output 16 in FIG. 1 in response to the signal shown in waveforms A and B; and Waveform F is a representation of the 545D (DELAYED) ENABLE signal which is present on line 40 in FIG. 1 in response to the signals shown as waveforms A and B.

More particularly, beginning at a time represented by the extreme left edge of FIG. 2, a standard signal has not yet been indicated on lines 20 and 24. Thus, waveform B (S) is low, waveform C (the signal at reset input 14) is high, and waveform F (545D ENABLE) is low. It should be noted that 545 enable signal is the logical inversion of the 545D enable signal. Thus, at this point the 545 ENABLE signal is high and the coincidence detection circuitry compares the 545 pulse train of waveform A with the I.V. pulse train, mentioned above, to determine phase and frequency correlation. Also, because the 545 ENABLE signal is high, toggle input 12 to flip-flop 10 is not latched, and it toggles as shown in waveform D. Specifically, pulses 50 and 52 in waveform A correspond respectively to negative pulses 54 and 56 in waveform D. In the circuit configuration of FIG. 1, flip-flop 10 would normally toggle in response to negative going edges 58 and 60 in negative pulses 54 and 56, respectively. However, because the reset input 14 is high at this time, Q output 16 (waveform E) remains low.

As mentioned above, the desired operation of the circuit of FIG. 1 is triggered when a standard signal is first detected, i.e., an S low-to-high transition is detected on lines 20 and 24. Rising edge 62 in waveform B corresponds to just such a transition. As can be seen in FIG. 2, this transition drives the reset input 14 low (shown by edge 64 in waveform C) which will allow flip-flop 10 to toggle on the next negative going pulse edge received at its toggle input 12. Reset input 14 is driven low immediately by edge 62 because Q output 16 of flip-flop 10 is low at this time. This keeps the input to gate 30 low, thereby making the signal on line 20 the controlling input to gate 22. Thus, at this point, waveform C goes low in response to waveform B going high.

The circuit of the preferred embodiment as illustrated in FIG. 1 is now awaiting a toggling edge at its input. Accordingly, edge 66 in waveform D, corresponding to pulse 68 in waveform A, toggles flip-flop 10 to drive its Q output 16 high as shown by ege 70 in waveform E. The corresponding $\overline{Q}$ output 18 goes low at this time which drives the 545D ENABLE signal high as shown by edge 72 in waveform F because of the action of gate 36. The normal operation of flip-flop 32, in turn, drives the 545 ENABLE signal low which latches the toggle input 12 to flip-flop 10 low as shown by extended pulse 74 in waveform D. It will be appreciated that the 545 ENABLE signal was not driven low by edge 62 in waveform B because of the latching action (at the input to gate 34) of the low signal from the output of gate 36. The 545 ENABLE signal was allowed to go low only after the S signal went high and the 545NOT (OVS,/545/) pulse toggled flip-flop 10.

Thus, at this point, PRESET 22 has been enabled by the high signal from Q output 16 as shown by the high signal following edge 70 in waveform E. Also, the coincidence detection circuitry has been enabled to compare the 545D pulses with the I.V. pulses to determine accurately phase and frequency correlations. However, it is desired that a 22 PRESET only occur once per standard signal. This is accomplished using the $\overline{545}$ signal received on line 28. After flip-flop 10 has been toggled once, Q output 16 is high, thereby making the input to gate 30 high when pulse 68 terminates at edge 76 as the $\overline{545}$ signal goes high again. This drives the input to gate 22 low which causes reset input 14 to receive a high signal, as shown by rising edge 78 in waveform C. This, in turn, resets Q output 16 to a low state as shown by edge 80 in waveform E. In this fashion, "PRESET 22" is discontinued shortly after it is initiated, and because of the action of the low 545 ENABLE signal at the toggle input 12 to flip-flop 10, it will not occur again until a nonstandard signal indication occurs on line 24 to drive the 545 ENABLE signal high. Correspondingly, the input to gate 30 will go low which causes its output to go high, thereby returning control of gate 22 to the S signal on line 20. Because at this point S (waveform B) is high, reset input 14 again goes low as shown by edge 82 in waveform C. Likewise, the low 545 ENABLE signal latches the input to gate 36 low, thus insuring that a high 545 ENABLE signal (shown as continuing pulse 84 in waveform F) will be generated at its output until the standard signal on line 24 terminates.

The circuit of FIG. 1 will remain in this state until, as mentioned, the signal on lines 20 and 24 goes low indicating the termination of the standard signal. This occurs at falling edge 86 in waveform B which has the immediate effect of driving reset input 14 high (shown by rising edge 88 in waveform C) and driving the 545D ENABLE signal low (shown by falling edge 90 in waveform F) through the action of gates 34 and 36 in flip-flop 32. At this point, the circuit has been reconfigured to once again look for a nonstandard to standard transition on lines 20 and 24 to once again initiate a "PRESET 22" condition.

As mentioned, to allow the coincidence detection circuits to make accurate phase and frequency correlations, the preferred embodiment of the present invention generates a 545D pulse which is delayed by a one horizontal line period from the 545 pulse. A circuit for generating this 545D pulse is illustrated by the schematic of FIG. 3 in integrated injection logic.

Generally, the circuit of FIG. 3 receives a 2H pulse train on a line 102 at the toggle input to a counter 104. When 104 reaches a "2" count it emits a 545D pulse on a line 106 at its M2 output. To time-coordinate these 545D pulse with the 545 pulses, a logic circuitry shown at the right in FIG. 3 comprising gates 110, 112, and 114 receives a $\overline{545}$ signal on a line 108 to control a reset input 116 to counter 104.

Figure 4:
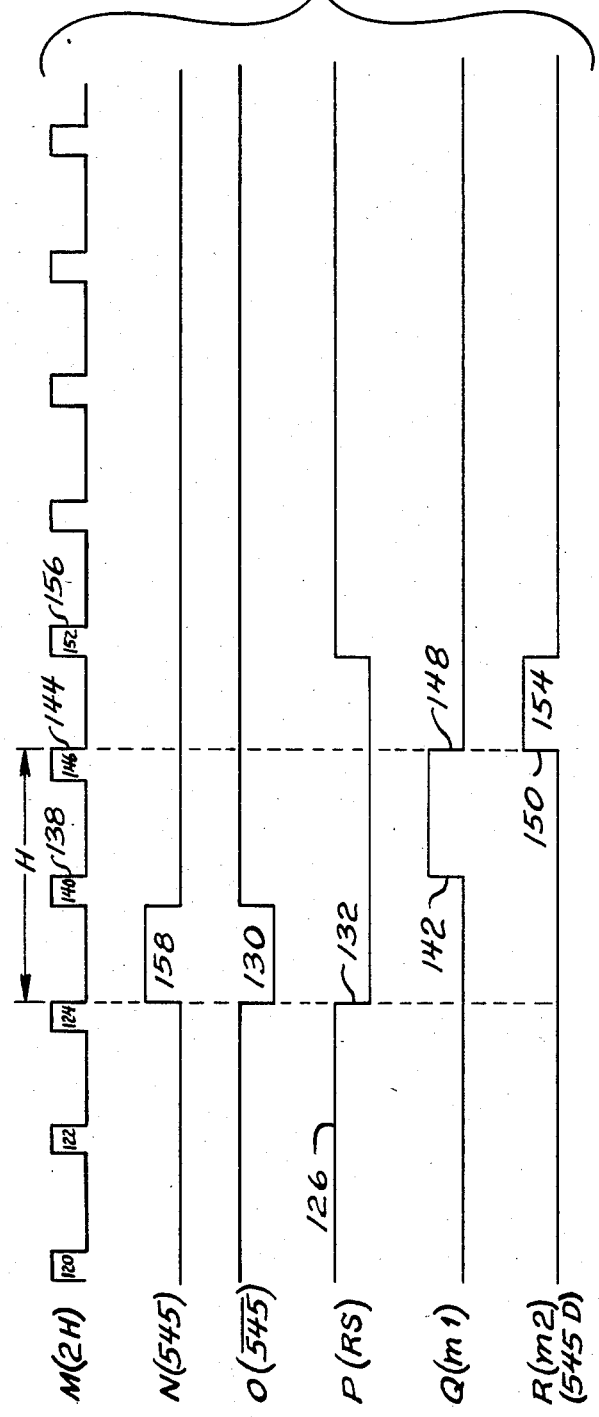
FIG. 4 is a collection of waveforms representing the signals present at various points in the circuit of FIG. 3.

The circuit of FIG. 3 may be more fully understood when explained in conjunction with the timing diagrams of FIG. 4 of which:

Waveform M is a representational illustration of a 2H signal which has two pulses per horizontal line;

Waveform N is a 545 signal;

Waveform O is a $\overline{545}$ signal which is the logical inversion of waveform N;

Waveform P is a representation of the signal present at reset input 16 to counter 104 in FIG. 3;

Waveform Q is a representation of the M1 output signal of counter 104 in FIG. 3; and Waveform R is a representation of the M2 output of counter 104 in FIG. 3 which corresponds to the 545D pulse which is emitted on line 106.

More particularly, the signal represented by waveform M having pulses 120, 122, and 124, among others, is received by counter 104 on a line 102. However, reset input 116 to counter 104 is normally set high (as shown by signal portion 126 of waveform P) through the latching action of flip-flop 128 comprising gates 110 and 112. Because of the high state of reset input 116, counter 104 does not toggle in response to pulses 120, 122, and 124. With the reset input to counter 104 high, its outputs M1 and M2 are low, thus forcing the input to gate 114 low. Therefore, the controlling input of flip-flop 128 is the input to gate 110 on line 108. When 545-NOT ($\overline{545}$) goes low, line 108 goes low and flip-flop 128 toggles such that the output of gate 112, line 116, goes low. This, in turn, allows counter 104 to count the 2H pulses. Thus, counter 104 toggles when the trailing edge 138 of pulse 140 is received on line 102. This causes the M1 output of counter 104 to go high as shown by edge 142 in waveform Q.

At this point, the counter 104 continues to receive pulses on line 102 and again toggles in response to the negative going edge 144 of pulse 146. This causes the M1 output to drop low and the M2 output to rise (shown by edges 148 and 150 in waveforms Q and R, respectively). This M2 output pulse is the 545D signal used for coincidence detection in other prior art circuitry. It should be noted that M2 (545D) goes high immediately after two of the 2H rate pulses have occured following the occurrence of the 545 signal. This corresponds exactly to a one line delay which is now necessary because of the one line advance of the 545 pulse. It should also be noted that the 545-NOT ($\overline{545}$) pulse has by now been terminated, thus allowing for the control of flip-flop 128 to be governed by the input to gate 114. At this time, the M2 input to gate 114 is high thereby enabling gate 114 to receive the next 2H rate pulse on its input line 134. When the 2H rate pulse 152 occurs, flip-flop 128 is reset to its initial configuration in which line 116 from gate 112 goes high, thereby resetting counter 104 and the system is returned to its initial configuration.

It will be appreciated from the relationship of the waveforms illustrated in FIG. 4 that the beginning of the 545D pulse 154 is delayed by a period equal to one horizontal line from the beginning of a 545 pulse 158. Thus, the 545D pulse may be used in the conincidence detection circuitry to accurately detect phase and frequency correlations even though the circuit has received a static phase correction of one horizontal line period.

To recapitulate briefly, the present invention seeks to provide a static phase correction so as to more nearly vertically center a displayed picture on the display raster. This may be done by means of a circuit which detects when a standard signal has been identified and, for the first vertical field following that identification, advances a vertical drive determining pulse by a one line period. Each ensuing vertical field is then defined by a vertical drive pulse which is separated from others by standard vertical field width but having the initial early generated vertical drive pulse as its reference. To accommodate this advancement in the vertical drive pulse, the circuit additionally provides for a delayed pulse for comparison in coincidence detection circuitry used to determine frequency and phase correlations. The overall operation of the preferred embodiment of the present circuitry is illustrated in the various waveforms of FIG. 5 which illustrates the correlations between the significant signals utilized in the present invention and of which:

Waveform W is an illustration of the integrated vertical pulses which are generated in response to the vertical sync information contained in the transmitted signal;

Waveform X is a representation of an S signal which is indicative of whether the circuit is in standard or nonstandard mode;

Waveform Y is a representation of the 545 pulse train produced by the vertical countdown circuitry of the television receiver; and Waveform Z is a representation of the 545D pulse train produced according to one aspect of the preferred embodiment which is used for coincidence detection after the 545 pulses have been advanced one horizontal line period.

Figure 5:
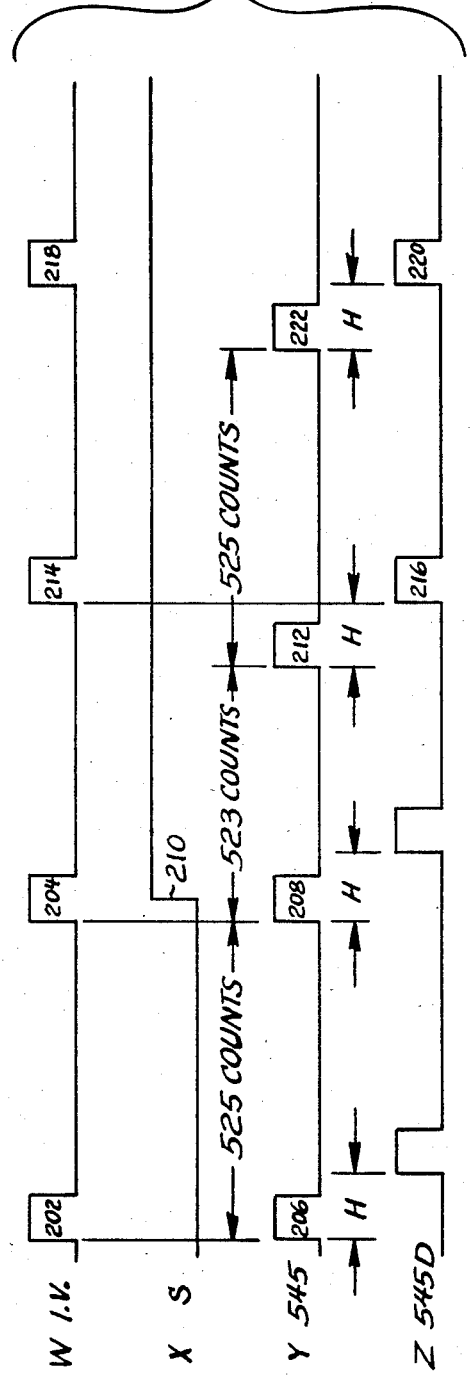
FIG. 5 is a collection of waveforms illustrating the static phase correction of the preferred embodiment of the present invention.

More particularly, the relationship between the various waveforms of FIG. 5 illustrates the operation of the circuit of the preferred embodiment. Specifically, I.V. pulses 202 and 204 in waveform W coincide with 545 pulses 206 and 208 in waveform Y and will be detected as coincident by the coincidence detection circuits. However, once the transistion from nonstandard to standard signal is indicated in waveform X by rising edge 210, the next 545 pulse 212 will occur 523 counts after the initiation of 545 pulse 208 thus effectively advancing the vertical drive pulse by a one line period. Also, I.V. pulse 214 and 545D pulse 216 are seen to coincide and are detected as coincidental in the coincidence detection circuits because those circuits have now been enabled to compare the 545D pulses with the I.V. pulses. This same relationship is further illustrated by the coincidence between I.V. pulse 218 and 545D pulse 220. 545 pulse 222 illustrates that each ensuing 545 pulse after the first advancement illustrated by pulse 212 will occur at 525 counts after the initiation of the previous 545 pulse. Thus, the present invention allows for a single static phase correction to more nearly center the vertical picture display while at the same time preserving the coincidence detection relationships necessary for other circuits in the receiver. Although a particular embodiment of the present invention has been shown and described, it will be appreciated by those who are skilled in the art and familiar with the teachings of this application that various changes and modifications may be made to the illustrated embodiment without departing from the broader aspects of the invention. Accordingly, the aim in the appended claims is to cover all such changes and modifications as may fall within the true spirit and scope of the invention. For example, modification may be made in the circuit to introduce a phase correction of more than a one line period if desired. This may be accomplished by adding additional counters as may be desired.

What is claimed is:

1. In a television receiving system for displaying received television picture signals having digital vertical synchronization means including vertical countdown means for counting from an original preset count to a predetermined higher count and generating a field determining pulse at said predetermined higher count, said system having mode recognition means for detecting whether said system is receiving a standard or a nonstandard signal and generating a representative output, and said system having frequency and phase detection means for comparing the generated field determining pulse with a received vertical sync derived field determining pulse, a method for statically adjusting the vertical centering of the displayed television picture including:

detecting a transition in said representative output indicative of a nonstandard to standard signal transition; and in response thereto advancing the preset count of said vertical countdown means by a predetermined count.

2. The method of claim 1 further including:
   returning said vertical countdown means preset to said original preset count after said countdown means has reached said predetermined count.

3. The method of claim 1 further including:
   generating a delayed field determining pulse having a delay corresponding to said predetermined count.

4. The method of claim 3 further including:
   enabling said frequency and phase detection means for comparing said delayed field determining pulse with said sync derived field determining pulse; and
   disabling said frequency and phase detection means from comparing said generated field determining pulse with said sync derived field determining pulse.

5. The method of claim 4 further including:

detecting a succeeding transition in said representative output indicative of a standard to nonstandard transition in said received signal;

disabling said frequency and phase detection means from comparing said delayed field determining pulse with said sync derived field determining pulse; and enabling said frequency and phase detection means to compare said generated field determing pulse with said sync derived field determing pulse.

6. In a television receiving system, including raster-scan display means for displaying received signals, for receiving standard and nonstandard signals and having means for generating a timed reference signal to initiate the vertical drive of the raster display for each vertical field, a method for providing a static phase adjustment in the vertical position of the displayed signal including:

detecting a nonstandard to standard signal transition; and advancing said timed reference signal by a predetermined period for the vertical field following said detected transition.

7. In a television receiving system, including raster-scan display means for displaying received signals, for receiving standard and nonstandard signals, said system having means for generating a timed reference signal to initiate the vertical drive of the raster display for each vertical field, means for providing static phase adjustment in the vertical position of the displayed signal including:

detecting means for detecting nonstandard to standard signal transition; and means for advancing said timed reference signal by a predetermined amount for the vertical field following said detected transition.

* * * * *